(12) United States Patent
Li

(10) Patent No.: US 10,655,717 B2
(45) Date of Patent: May 19, 2020

(54) ELECTRIC DRIVE AXLE ASSEMBLY AND VEHICLE HAVING THE SAME

(71) Applicant: BYD COMPANY LIMITED, Shenzhen, Guangdong (CN)

(72) Inventor: Dongdong Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 32 days.

(21) Appl. No.: 16/015,353

(22) Filed: Jun. 22, 2018

(65) Prior Publication Data

US 2018/0299001 A1 Oct. 18, 2018

Related U.S. Application Data

(63) Continuation of application No. PCT/CN2016/112658, filed on Dec. 28, 2016.

(30) Foreign Application Priority Data

Dec. 31, 2015 (CN) .......................... 2015 1 1030700
Dec. 31, 2015 (CN) ..................... 2015 2 1135686 U

(51) Int. Cl.
*F16H 48/08* (2006.01)
*F16H 37/08* (2006.01)
(Continued)

(52) U.S. Cl.
CPC ......... *F16H 37/0813* (2013.01); *B60B 35/12* (2013.01); *B60K 1/00* (2013.01);
(Continued)

(58) Field of Classification Search
CPC .. F16H 37/0813; F16H 63/345; F16H 57/037; F16H 57/025; F16H 3/091;
(Continued)

(56) References Cited

U.S. PATENT DOCUMENTS 7,448,978 B2 11/2008 Habel
8,312,948 B1 * 11/2012 Carrington .............. B60T 1/062
180/6.48
(Continued)

FOREIGN PATENT DOCUMENTS

CN 201856623 U 6/2011
CN 103496320 A 1/2014
(Continued)

OTHER PUBLICATIONS

International Search Report and Written Opinion for Application No. PCT/CN2016/112658, dated Mar. 29, 2017, 9 pages.

*Primary Examiner* — Patrick H Mackey

(57) ABSTRACT

An electric drive axle assembly and a vehicle having the same are provided. The electric drive axle assembly includes: an electric powertrain, an axle housing assembly, and a central parking module. The electric powertrain includes a power motor, a transmission and a differential with an input end and two output ends; and the power motor is connected to the input end of the differential through the transmission. The axle housing assembly includes an axle housing component and two half axles; the two half axles and the differential are disposed in the axle housing component; the two half axles are connected to the two output ends of the differential respectively; and the electric powertrain is installed on the axle housing component. The central parking module is installed on the axle housing component and used for braking the input end of the differential.

14 Claims, 2 Drawing Sheets

(51) Int. Cl.
| | |
|---|---|
| *B60K 17/16* | (2006.01) |
| *B60K 17/08* | (2006.01) |
| *B60K 1/00* | (2006.01) |
| *B60B 35/12* | (2006.01) |
| *B60K 17/04* | (2006.01) |
| *B60T 1/06* | (2006.01) |
| *F16H 3/091* | (2006.01) |
| *F16H 57/025* | (2012.01) |
| *F16H 57/031* | (2012.01) |
| *F16H 57/037* | (2012.01) |
| *F16H 63/34* | (2006.01) |

(52) U.S. Cl.
CPC ............ *B60K 17/043* (2013.01); *B60K 17/08* (2013.01); *B60K 17/16* (2013.01); *B60K 17/165* (2013.01); *B60T 1/062* (2013.01); *B60T 1/067* (2013.01); *F16H 3/091* (2013.01); *F16H 48/08* (2013.01); *F16H 57/025* (2013.01); *F16H 57/031* (2013.01); *F16H 57/037* (2013.01); *F16H 63/345* (2013.01); *B60K 2001/001* (2013.01); *B60Y 2200/90* (2013.01); *B60Y 2400/42* (2013.01); *B60Y 2400/74* (2013.01)

(58) Field of Classification Search
CPC .......... F16H 48/08; B60T 1/067; B60T 1/062; B60K 17/16; B60K 17/043; B60B 35/12
See application file for complete search history.

(56) References Cited

U.S. PATENT DOCUMENTS

| | | | | |
|---|---|---|---|---|
| 8,540,067 | B2* | 9/2013 | Kingston | B60K 17/346 192/218 |
| 8,880,260 | B2* | 11/2014 | Nakagawara | B60T 1/005 701/22 |
| 8,967,304 | B2* | 3/2015 | Klopzig | B60K 6/46 180/65.21 |
| 9,233,666 | B2* | 1/2016 | Al-Regib | B60T 1/062 |
| 9,964,126 | B2* | 5/2018 | Murashima | F16H 63/3416 |
| 2017/0074378 | A1* | 3/2017 | Kirchner | B60K 1/04 |

FOREIGN PATENT DOCUMENTS

| | | | |
|---|---|---|---|
| CN | 204452414 U | * | 7/2015 |
| CN | 204452414 U | | 7/2015 |
| CN | 204845500 U | | 12/2015 |
| CN | 205326796 U | | 6/2016 |
| CN | 105966235 A | | 9/2016 |
| DE | 102004058984 A1 | | 6/2006 |

* cited by examiner

ELECTRIC DRIVE AXLE ASSEMBLY AND VEHICLE HAVING THE SAME

CROSS-REFERENCE TO RELATED APPLICATIONS

This application is a continuation application of International Application No. PCT/CN2016/112658, filed on Dec. 28, 2016, which is based on and claims priority to and benefits of Chinese Patent Application Nos. 201511030700.6 and 201521135686.1, both filed with the State Intellectual Property Office (SIPO) of the People's Republic of China on Dec. 31, 2015. The entire contents of the above-identified applications are incorporated herein by reference.

TECHNICAL FIELD

Embodiments of the present disclosure relates to an electric drive axle assembly, and a vehicle having the electric drive axle assembly.

BACKGROUND

In a related technology of an electric drive axle assembly, it is difficult to arrange a parking brake to the electric drive axle assembly, and when the electric drive axle assembly has several gears, a problem of gear failure may occur, which may affect the safety, so there is a room for improvement on the electric drive axle assembly.

SUMMARY

Embodiments of the present disclosure seek to solve at least one of the foregoing technical problems in the prior art. Therefore, the first aspect of the present disclosure provides an electric drive axle assembly having easy arrangement and high safety.

The second aspect of the present disclosure further provides a vehicle having the electric drive axle assembly.

The electric drive axle assembly according to embodiments of the present disclosure includes: an electric powertrain, comprising: a power motor, a transmission and a differential with an input end and two output ends, wherein the power motor is connected to the input end of the differential through the transmission; an axle housing assembly, comprising an axle housing component and two half axles, wherein the two half axles and the differential are disposed in the axle housing component, and the two half axles are connected to the two output ends of the differential respectively, and the electric powertrain is installed on the axle housing component; and a central parking module installed on the axle housing component and used for braking the input end of the differential directly.

With the electric drive axle assembly according to the embodiments of the present disclosure, the electric powertrain, the central parking module and the axle housing assembly are integrated together, so the electric drive axle assembly has the advantages of compact structure, small volume, and easy arrangement. Moreover, the input end of the differential is braked by the central parking module directly, which may avoid a possible risk of parking failure of the vehicle during a shifting process of the transmission, and ensure the safety and reliability of the electric drive axle assembly.

According to an embodiment of the present disclosure, the central parking module and the electric powertrain are arranged at the front and back sides of the axle housing component respectively.

According to an embodiment of the present disclosure, the central parking module includes: a parking box, installed on the axle housing component; and a parking brake, fixed to the parking box and configured to brake the input end of the differential directly.

According to an embodiment of the present disclosure, the input end of the differential comprises a differential input gear; and the central parking module further comprises: a parking shaft, connected to the parking brake; and a parking gear, fixed to the parking shaft and engaged with the differential input gear.

According to an embodiment of the present disclosure, the parking shaft is supported on the parking box through a parking bearing.

According to an embodiment of the present disclosure, the parking shaft and the parking gear are integrated as a parking gear shaft.

According to an embodiment of the present disclosure, the parking brake includes: a brake drum, connected to the parking shaft; and a brake structure, selectively joined with the brake drum to brake the brake drum.

According to an embodiment of the present disclosure, the central parking module further includes a connecting box, and the parking brake and the parking box are connected through the connecting box.

According to an embodiment of the present disclosure, the central parking module further includes a flange fixed to the parking shaft and disposed within the connecting box, and the brake drum is connected to the parking shaft through the flange.

According to an embodiment of the present disclosure, the transmission has a transmission housing with the power motor fixed thereon, the transmission housing is fixed to one side of the axle housing component, the central parking module is disposed to the other side of the axle housing component, and the differential is supported on the transmission housing and the parking box.

According to an embodiment of the present disclosure, the axle housing component includes an axle housing and an axle cover, the transmission housing is fixed to one side of the axle housing, the axle cover is detachably disposed to the other side of the axle housing, the axle cover is configured as a cylindrical structure having two open ends, and the parking box passes through the axle cover and is supported on the axle cover.

According to an embodiment of the present disclosure, the transmission includes: an input shaft fixed with an input gear, and connected to a motor output shaft of the power motor; an intermediate shaft fixed with an intermediate gear and a plurality of gear driving gears, wherein the intermediate gear is engaged with the input gear; and an output shaft fixed with an output gear engaged with the differential input gear, wherein a plurality of gear driven gears are freely fitted over the output shaft and engaged with the plurality of gear driving gears respectively.

According to an embodiment of the present disclosure, the plurality of gear driving gears include: a first-gear driving gear and a second-gear driving gear; and the plurality of gear driven gears comprises: a first driven gear engaged with the first-gear driving gear, and a second driven gear engaged with the second driven gear;

According to an embodiment of the present disclosure, the transmission further includes: a synchronizer that selectively joins one of the first driven gear and the second driven gear with the output shaft.

A vehicle according to a second aspect of the present disclosure includes an electric drive axle assembly according to the first aspect of the present disclosure, so that the vehicle has the advantages of compact structure, easy arrangement and safe and reliable parking.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
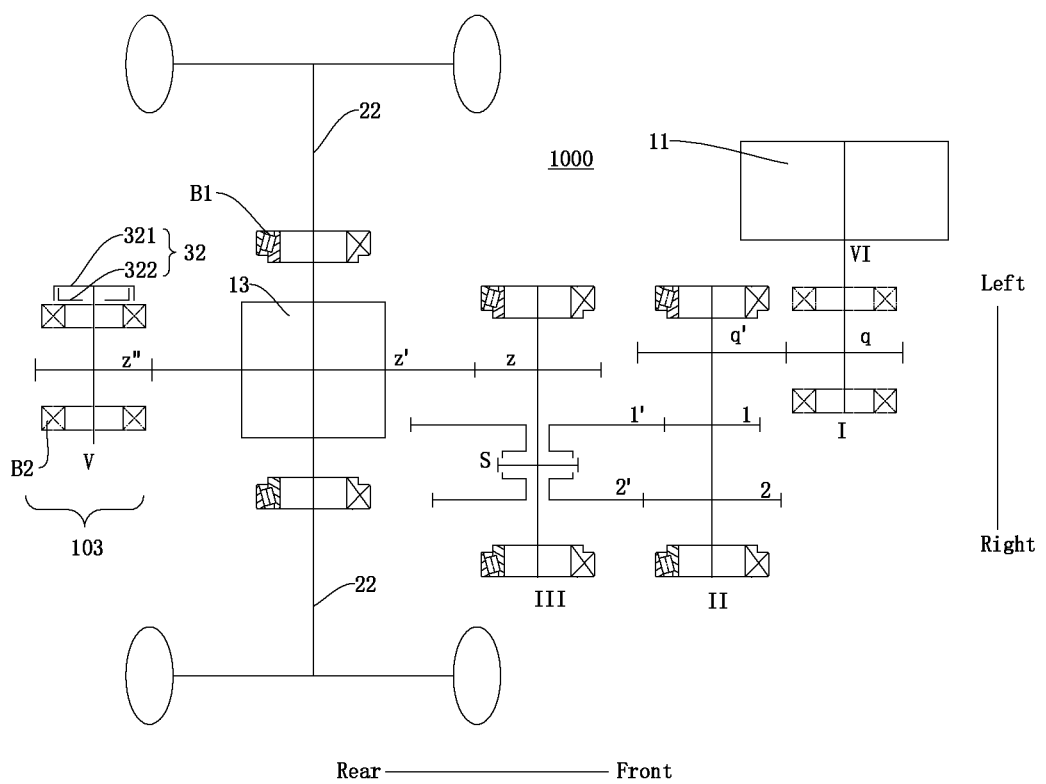
FIG. 1 is a schematic diagram showing a transmission structure of the vehicle according to an embodiment of the disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description of the present disclosure, it should be understood that, location or position relationships indicated by the terms, such as "center", "longitude", "transverse", "length", "width", "thickness", "up", "down", "front", "rear", "left", "right", "vertical", "horizon", "top", "bottom", "inside", "outside", "clockwise", and "counterclockwise", are location or position relationships based on illustration of the accompanying drawings, are merely used for describing the present disclosure and simplifying the description instead of indicating or implying the indicated apparatuses or elements should have specified locations or be constructed and operated according to specified locations, and therefore, should not be intercepted as limitations to the present disclosure.

In addition, the terms such as "first" and "second" are used merely for the purpose of description, but shall not be construed as indicating or implying relative importance or implicitly indicating a number of the indicated technical feature. Hence, the feature defined with "first" and "second" may explicitly or implicitly include one or more of features. In the description of the present disclosure, unless otherwise explicitly specifically defined, "a plurality of" means at least two, for example, two or three.

In the present disclosure, unless otherwise explicitly specified or defined, the terms such as "mount", "connect", "connection", and "fix" should be interpreted in a broad sense. For example, a connection may be a fixed connection, or may be a detachable connection or an integral connection; a connection may be a mechanical connection, or may be an electrical connection; a connection may be a mechanical connection, or may be an electrical connection, or may be used for intercommunication; a connection may be a direct connection, or may be an indirect connection via an intermediate medium, or may be communication between interiors of two elements or an interaction relationship between two elements. It may be appreciated by those of ordinary skill in the art that the specific meanings of the aforementioned terms in the present disclosure can be understood depending on specific situations.

In the present disclosure, unless otherwise explicitly specified or defined, a first feature being "above" or "under" a second feature may include that the first and second features are in direct contact and may also include that the first and second features are not in direct contact but are in contact by means of another feature therebetween. In addition, the first feature being "over", "above" or "on the top of" a second feature may include that the first feature is over or above the second feature or merely indicates that the horizontal height of the first feature is higher than that of the second feature. The first feature being "underneath", "below" or "on the bottom of" a second feature may include that the first feature is underneath or below the second feature or merely indicates that the horizontal height of the first feature is lower than that of the second feature.

Figure 2:
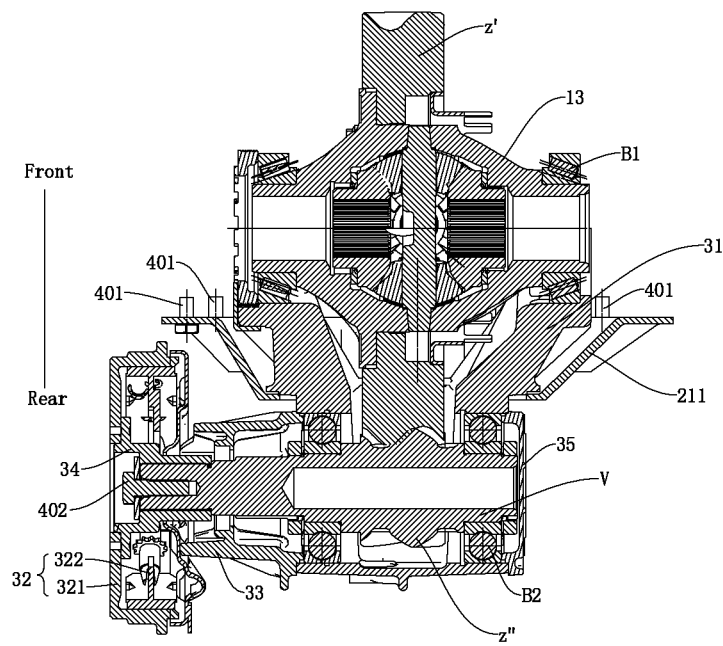
FIG. 2 is a schematic diagram of a central parking module of an electric drive axle assembly according to the embodiment of the disclosure.
Figure 3:
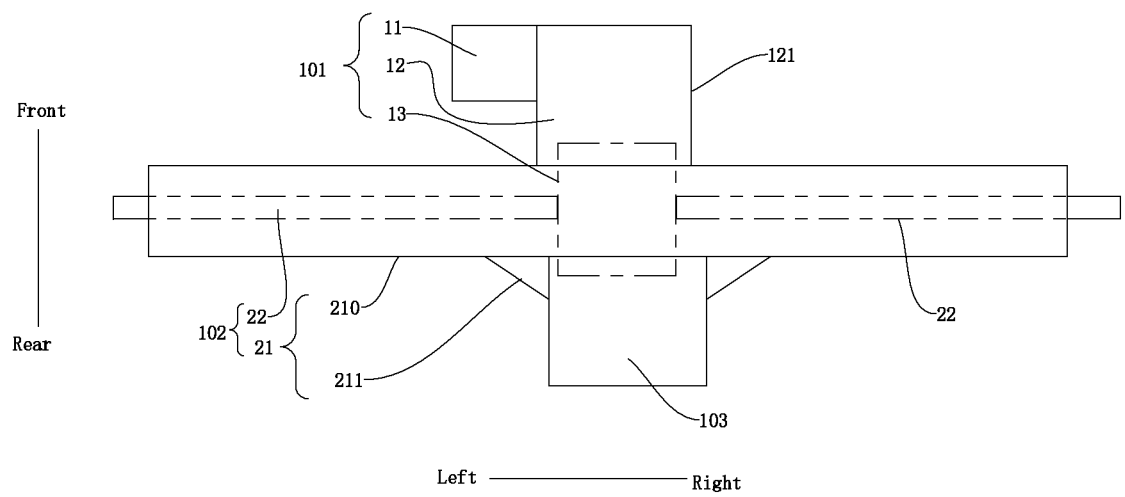
FIG. 3 is a layout diagram of an electric drive axle assembly according to an embodiment of the disclosure.

An electric drive axle assembly 100 according to embodiments of the present disclosure is described by referring to FIG. 1 to FIG. 3. As shown in FIGS. 1-3, the electric drive axle assembly 100 includes an electric powertrain 101, an axle housing assembly 102 and a central parking module 103.

As shown in FIGS. 1-3, the electric powertrain 101 includes a power motor 11, a transmission 12 and a differential 13. As shown in FIG. 3, the axle housing assembly 102 includes an axle housing component 21 and two half axles 22, wherein the two half axles 22 and the differential 13 are disposed in the axle housing component 21.

The differential 13 has an input end and two output ends. The output end of the differential 13 is configured to output the power from the input end of the differential 13. The power motor 11 is connected to the input end of the differential through the transmission 12. The two half axles are connected to the two output ends of the differential respectively to output power.

As shown in FIG. 3, the electric powertrain 101 is installed at the axle housing component 21. The central parking module 103 is installed at the axle housing component 21. With this arrangement, the electric powertrain 101, the central parking module 103 and the axle housing assembly 102 are integrated into a whole, which has the advantages of compact structure, simple assembly, mass reduction, small volume, little space occupation, thus facilitating arrangement in vehicle 1000. This arrangement also result in a shortened transmission chain, such that the transmission loss is small and the transmission efficiency is high. In particular, the central parking module 103 is integrated and installed to the axle housing component 21, which has high reliability and low cost.

As shown in FIG. 1 and FIG. 2, the central parking module 103 is configured to brake the input end of the differential 13 directly. As such, when the vehicle is required to be parked, the central parking module 103 may brake the input end of the differential directly without going through the transmission 12, thus shortening the transmission chain and reducing the volume, which is convenient for arrangement of the central parking module 103.

When the vehicle 1000 is required to run, the power is transmitted from the power motor 11 to the transmission 12. The power can be transmitted to the input end of the differential 13 in different ratios, in other words, the power output from the power motor 11 is transmitted to the input end of the differential 13 after the speed and torque adjustments of the transmission 12, and then transmitted from the output end of the differential 13 to the wheels at two sides via the two half axles, so as to drive the vehicle 1000 to run.

When the vehicle 1000 is required to be parked, the central parking module 103 is pulled by manual or electro-hydraulic gas control, and the power motor 11 is unloaded simultaneously, in which case the power is no longer transmitted to the wheels from the power motor 11 but the torque is transmitted from the wheels to the input end of the differential 13 due to the inertia or the self-gravity force on the ramp. At this time, the power motor 11 is unloaded, and the transmission 12 may be in neutral, that is, the power motor 11 cannot provide the corresponding torque to park the vehicle 1000. The central parking module 103 may brake the input end of the differential 13 directly, and stop the rotation of the wheels by the output end of the differential 13 and the half axles 22, so as to park the vehicle 1000.

With the electric drive axle assembly 100 according to the embodiments of the present disclosure, the electric powertrain 101, the axle housing assembly 102 and the central parking module 103 are integrated together, so the electric drive axle assembly has the advantages of compact structure, small volume, and easy arrangement. Moreover, the input end of the differential is braked by the central parking module 103 directly, which may avoid a possible risk of parking failure of the vehicle during a shifting process of the transmission 12, and ensure the safety and reliability of the electric drive axle assembly 100.

In the following, the electric drive axle assembly 100 according to the embodiments of the present disclosure is described in detail by referring to FIG. 1 to FIG. 3. As shown in FIGS. 1-3, the electric drive axle assembly 100 includes the electric powertrain 101, the axle housing assembly 102 and the central parking module 103.

The electric powertrain 101 includes the power motor 11, the transmission 12 and the differential 13. The axle housing assembly 102 includes the axle housing component 21 and the two half axles 22. The two half axles 22 and the differential 13 are disposed in the axle housing component 21.

The differential 13 has the input end and the two output ends. The output ends of the differential 13 are adapted to output the power from the input end of the differential 13. The power motor 11 is connected to the input end of the differential through the transmission 12. The two half axles 22 is connected to the two output ends of the differential 13 respectively.

In other words, the power output from the power motor 11 is transmitted to the input end of the differential 13 after the speed and torque adjustments of the transmission 12, and then is transmitted from the input end of the differential 13 through the output end of the differential 13 to the two half axles 22 which drive the wheels connected thereto to rotate, so as drive the vehicle 1000 to run.

The electric powertrain 101 and the central parking module 103 are installed at the axle housing component 21, which makes the electric drive axle assembly 100 having a higher degree of integration, more functions, and a more convenient vehicle layout.

In some embodiments, the central parking module 103 and the electric powertrain 101 are disposed at front and rear sides of the axle housing component 21 respectively. That is to say, the central parking module 103 and the electric powertrain 101 are disposed at different sides of the axle housing component 21.

With reference to an embodiment of FIG. 3, the central parking module 103 is disposed to the rear side of the axle housing component 21, and the electric powertrain 101 is disposed to the front side of the axle housing component 21. Of course, in some other embodiments, the central parking module 103 may be disposed at the front side of the axle housing component 21, and the electric powertrain 101 may be disposed at the rear side of the axle housing component 21.

In this way, the electric powertrain 101 and the central parking module 103 are installed at different sides of the axle housing component 21, thereby reducing the occupied space of the electric powertrain 101 so as to facilitate the vehicle layout. This arrangement is especially adapted for the electric powertrain 101 having a power motor 11 with high power and large volume, such that the electric drive axle assembly 100 has a compact arrangement and a reasonable structure, makes full use of the vehicle space and reduces the assembly difficulty at the same time of meeting the requirement of driving in high power.

With reference to the embodiment of FIG. 3, the transmission 12 has a transmission housing 121, and the power motor 11 is disposed to the transmission housing 121. The transmission housing 121 is fixed to one side (for example, a front side shown in FIG. 3) of the axle housing component 21. The central parking module 103 is mounted to the other side (for example, a rear side shown in FIG. 3) of the axle housing component 21.

The transmission housing 121 may be configured as an installation carrier of the power motor 11, and configured as a connection part between the electric powertrain 101 and the axle housing assembly 102, and the central parking module 103 is also fixed to the axle housing component 21, such that the power motor 11, the transmission 12, the differential 13, the central parking module 103 as well as the axle housing assembly 102 are integrated together, and the central parking module 103 and the power motor 11 are installed at opposite sides of the axle housing component 21 respectively, so the electric drive axle assembly 100 has the advantages of compact structure and reasonable arrangement.

In some embodiments, the power motor 11 may be fixed to the transmission housing 121 through a threaded connector, and the transmission housing 121 can be fixed to the axle housing component 21 through a threaded connector.

With reference to an embodiment of FIG. 2, the central parking module 103 includes a parking box 31 and a parking brake 32. The parking box 31 is installed at the axle housing component 21, and the parking brake 32 is fixed to the parking box 31 and configured to brake the input end of the differential 13 directly. As a result, the parking box 31 is configured as a connecting component between the parking brake 32 and the axle housing component 21, so that the central parking module 103 can be installed to the axle housing component 21 conveniently.

With reference to the embodiment of FIG. 2, the axle housing component 21 includes an axle housing 210 and an axle cover 211. The transmission housing 121 is fixed to one side of the axle housing 210, and the axle cover 211 is detachably located at the other side of the axle housing 210, that is, the axle cover 211 and the central parking module 103 are located at the same side.

In some embodiments, the middle of the axle housing 210 has a differential accommodation space whose two open end faces are open. The axle cover 211 is detachably installed to one open end face in the middle of the axle cover 210, and the transmission housing 121 is fixed to the other open end face in the middle of the axle cover 210.

In some embodiments, the axle cover 211 is detachably mounted to the axle cover 210 through a threaded connector. Specifically, as shown in FIG. 2, the threaded connector is configured as a bolt 401. The axle cover 211 is connected to the one open end face of the middle of the axle cover 210 by the threaded connection of multiple bolts 401 disposed at intervals along a circumferential direction of the axle cover 211. In this way, the axle cover 211 is detachably installed to the axle housing 210, which may make the installation of the electric powertrain 101 more convenient, the fixing structure simpler and the operation easier. Particularly, the axle cover 211 is detachably assembled to the one open end face of the middle of the axle cover 210, which may effectively reduce the assembly difficulty of the electric powertrain 101 and the two half axles 22, and be more convenient for the maintenance of the differential 13.

With reference to the embodiment of FIG. 2, the axle cover 211 is configured as a barrel-shaped structure with two open ends. The parking box 31 passes through the axle cover 211 and is supported on the axle cover 211, such that the parking box 31 is mounted to the transmission housing 121 through the fixing of the axle cover 211 and the axle housing 210. In particular, a cross sectional area of the barrel shaped structure is increased from an end away from the axle housing 210 towards an end near the axle cover 210, thereby facilitating the penetration of the parking box 31, which makes the installation of the central parking module 103 more convenient.

The differential 13 is supported on the transmission housing 121 and the parking box 31. Accordingly, the parking box 31 passes through the axle cover 211 and is installed to the transmission housing 121 through the fixing of the axle cover 210 and the axle cover 211, such that the transmission housing 121 and the parking box 31 constitute a support structure of the differential 13 to support the differential 13 together. As such, the support for the differential 13 is more stable and the structure of the electric drive axle assembly 100 is more compact, thereby further saving the accommodation space. In some embodiments, the differential 13 is supported on the transmission housing 121 and the parking box 31 through a differential bearing B1. The differential bearing B1 includes two tapered roller bearings, that is, the two tapered roller bearings are both clamped between the transmission housing 121 and the parking box 31.

In some embodiments, the parking box 31 may be fixed to the transmission housing 121 through a screw thread fastener.

As shown in FIG. 1 and FIG. 2, the input end of the differential 13 includes a differential input gear z'. The central parking module 103 further includes a parking shaft V and a parking gear z" fixed to the parking shaft V. The parking gear z" is engaged with the differential input gear z'. The parking shaft V is connected to the parking brake 32.

In other words, the parking brake 32 may selectively brake the parking shaft V. Because the parking gear z" is fixed to the parking shaft V, and the parking gear z" is engaged with the differential input gear z', the parking brake 32 can selectively brake the differential input gear z'.

In some embodiments, the parking shaft V is supported on the parking box 31 via a parking bearing, such that the parking shaft V may be better supported on the parking box 31. As shown in FIG. 2, the bearing may include two deep groove ball bearings disposed at intervals along an axial direction of the parking shaft V, and the parking gear z" is located between the two deep groove ball bearings.

In some embodiments, the parking shaft V and the parking gear z" are integrated as a parking gear shaft, thereby having a simple structure with high strength, saving the assembly steps, and being convenient in installation. In an embodiment, the parking gear shaft may have a weight-reducing structure, and for example, the weight reducing structure is configured as a weight-reducing hole, which may ensure the strength of the parking gear shaft and reduce the weight of the parking gear shaft at the same time, such that the central parking module 103 has lightweight and it is easy to install and integrate the central parking module 103 and the axle housing component 21.

With reference to the embodiment of FIG. 2, the parking brake includes a brake drum 321 and a brake structure 322. The brake drum 321 is connected to the parking shaft V and rotates together with the parking shaft V. The brake structure 322 is selectively joined with the brake drum 321 to brake the brake drum 321. In some embodiments, the brake structure 322 includes a friction plate, and the brake structure 322 is selectively joined with the brake drum 321 through friction of the friction plate.

In order to facilitate installation of the parking brake 32, the parking shaft V and the parking gear z", the central parking module 103 further includes a connecting box 33, and the parking brake 32 and the parking box 31 are connected through the connecting box 33. Thus, when the electric drive axle assembly 100 is assembled, the parking box 31 passes through the connecting box 33 and is install to the transmission housing 121, then the parking shaft V and the parking gear z" are installed, and at last the connecting box 33 and the parking brake 32 are installed. Since the connecting box 33 and the parking box 31 are configured as a split structure, the integrated installation among the central parking module 103, the electric powertrain 101 and the axle housing assembly 102 is convenient, and the installation of the central parking module 103 is also convenient.

As shown in FIG. 2, the central parking module 103 further includes a flange 34 fixed to the parking shaft V and disposed within the connecting box 33, and the brake drum 321 is connected to the parking shaft V through the flange 34, such that the connection between the parking shaft V and the brake drum 321 is simple, and the installation of the central parking module 103 is convenient. In some embodiments, the flange 34 and the parking shaft V may be fixed through a threaded connector, and the threaded connector may be configured as a bolt 402.

With reference to the embodiment of FIG. 2, the parking shaft V is supported on the parking box 31, two ends of the parking box 3 are open, and one end of the parking shaft V (for example, a right end of the parking shaft V as shown in FIG. 2) passes through one end of the parking box 31 and extends toward the parking brake 32, and then passes through the connecting box 33 and is fixed to the brake drum 321 through the flange 34. The other end of the parking box 31 is sealed through an end cover 35. The flange 34 is provided with a through hole, and a threaded hole is arranged in one end face of the parking shaft V, and the bolt 402 passes through the through hole and is threadedly connected within the threaded hole.

With reference to FIG. 1 to FIG. 3, a parking process of the electric drive axle assembly 100 according to the embodiments of the present disclosure is described in detail.

When the vehicle 1000 is required to be parked, the brake structure 322 of the parking brake 32 is pulled by manual or electro-hydraulic gas control, and the power motor 11 is unloaded simultaneously, in which case the power is no longer transmitted from the power motor 11 to the wheels at the two sides but the torque is transmitted from the wheels to the input end of the differential 13 due to the inertia or the self-gravity force on the ramp. Since the power motor 11 is unloaded, the transmission 12 may be in neutral, that is, the power motor 11 cannot provide the corresponding torque to park the vehicle 1000. At this time, the brake structure 322 (e.g. the friction plate) of the parking brake 32 is joined with the brake drum 321 under tension to stop the rotation of the brake drum 321 via friction. Because the brake drum 321 is connected to the brake shaft V, the parking gear z″ is engaged with the differential input gear z′, which may prevent the rotation of the differential input gear z′, and prevent the rotation of the wheels through the output end of the differential 13 and the driver shaft 22, so as to realize the parking of the vehicle.

According to embodiments of the present disclosure, the electric drive axle assembly may adopt a transmission having different gears, and thus have a wide application range. As shown in FIG. 1, the transmission 12 may include an input shaft I, an intermediate shaft II, and an output shaft III. The input shaft I, the intermediate shaft II, and the output shaft III are supported on the transmission housing 121 by a bearing. In some embodiments, as shown in FIG. 1, the input shaft I, the intermediate shaft II and the output shaft III are extended along a width direction of the vehicle 1000, that is, a left-right direction of the vehicle 1000.

The input shaft I is connected to a motor output shaft VI of the power motor 11, for example, the input shaft I is connected with the motor output shaft VI via a spline. In an embodiment, the input shaft I has an internal spline and the motor output shaft VI has an external spline fitted with the internal spline of the input shaft I. In some embodiments, the input shaft I and the motor output shaft VI may be connected through a shaft coupling. According to the embodiment of the present disclosure, the motor output shaft VI is directly connected with the input shaft I of the transmission 12, such that the electric powertrain 101 has a short transmission chain, and a simple structure.

As shown in FIG. 1, the input shaft I is fixed with an input gear q, that is, the input gear q may rotate synchronously with the input shaft I. The intermediate shaft II is fixed with an intermediate gear q′, that is, the intermediate gear q′ may rotate synchronously with the intermediate shaft II. The intermediate gear q′ is meshed with the input gear q, and the intermediate shaft II is fixed with a plurality of gear driving gears, that is, the plurality of gear driving gears may rotate synchronously with the intermediate shaft II. A plurality of gear driven gears are fitted over the output shaft III, that is, each gear driven gear may rotate relative to the output shaft III. The plurality of gear driven gears and the plurality of gear driving gears are meshed correspondingly. In one embodiment, the intermediate shaft II and the output shaft III may have different lengths and structures, different numbers of pairs of engaged gears are provided on the intermediate shaft II and the output shaft III, such that the transmission 12 may have output of more gears.

In some embodiments, the output shaft III further includes an output gear z fixed thereto, that is, the output gear z may synchronously rotate with the output shaft III. The output gear z may mesh with the differential input gear z′ of the differential 13, such that the power output from the power motor 11 is transmitted to the differential input gear z′ through the transmission 12, and drives the half axles 22 and the wheels through the output end of the differential 13, to drive the vehicle 1000 to run.

In an embodiment, the plurality of gear driving gears include a first-gear driving gear 1 and a second-gear driving gear 2, in which the first-gear driving gear 1 and the second-gear driving gear 2 are spaced apart along an axial direction of the intermediate shaft II and fixed to the intermediate shaft II. The plurality of gear driven gears include a first-gear driven gear 1′ and a second-gear driven gear 2′. The first-gear driven gear 1′ is engaged with the first-gear driving gear 1 and the second-gear driven gear 2′ is engaged with the second-gear driving gear 2. The first-gear driven gear 1′ and the second-gear driven gear 2′ are spaced apart along an axial direction of the output shaft III and fitted over the output shaft III. A synchronizer S is configured to selectively join one of the first-gear driven gear 1′ and the second-gear driven gear 2′ to the output shaft III, that is, the synchronizer S may join the first-gear driven gear 1′ to the output gear III to make the first-gear driven gear 1′ rotate synchronously with the output shaft III, and the synchronizer S may join the second-gear driven gear 2′ to the output gear III to make the second-gear driven gear 2′ rotate synchronously with the output shaft III. The synchronizer S may be located at an intermediate position where the synchronizer S joins neither the first-gear driven gear 1′ nor the second-gear driven gear 2′ to the output shaft III, that is, the synchronizer S is disposed at the neutral position. The output gear z is fixed to the output shaft III.

In this embodiment, the transmission 12 is configured as a two gears transmission which has the advantages of simple structure, light weight, large speed ratio, large torque, strong dynamic performance and good control performance, and can meet the use requirements of vehicles of general models.

For the electric drive axle assembly 100 according to embodiments of the present disclosure, the central parking module 103 is disposed to the axle housing component 21, the central parking module 103 and the electric powertrain 101 are disposed at two sides of the axle housing assembly 102 respectively, and the parking gear z″ is engaged with the differential input gear z′ directly, such that in one aspect, it takes less space at both sides of the motor to facilitate the arrangement of the vehicle, and in the other aspect, it has the advantages of safety and reliability since the parking failure won't occur in the shifting process of the transmission 12. Compared with the traditional driving brake that is integrated with the parking brake 32, the central parking module 103 has higher reliability and lower cost.

The vehicle 1000 according to the present disclosure is described with reference to the embodiment of FIG. 1. The vehicle 1000 includes the electric drive axle assembly 100 as described in any one of the above embodiments. Since the vehicle 1000 includes the electric drive axle assembly 100 as described above, the vehicle has the advantages of simple structure, convenient arrangement, reliable parking and high security by integrating the central parking module 103 to the axle housing assembly 102. In addition, due to the adoption of the electric drive axle assembly 100, the vehicle has the advantages of short driving chain, little space occupation and convenient arrangement, especially for arrangement of a battery system, which saves space for the installation of the battery system and is conducive to improving the battery life.

In the descriptions of this specification, a description of a reference term such as "an embodiment", "some embodiments", "exemplary embodiments", "examples", "specific examples", or "some examples" means that a specific feature, structure, material, or characteristic that is described with reference to the embodiment or the example is included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples. Moreover, those skilled in the art can joint and combine different embodiments or examples described in the present description.

Although the embodiments of the present disclosure have been shown and described, a person of ordinary skill in the art can understand that multiple changes, modifications, replacements, and variations may be made to these embodiments without departing from the principle and purpose of the present disclosure.

What is claimed is:

1. An electric drive axle assembly, comprising:
    an electric powertrain, comprising a power motor, a transmission, and a differential with an input end and two output ends, wherein the power motor is connected to the input end of the differential through the transmission;
    an axle housing assembly, comprising an axle housing component and two half axles, wherein the two half axles and the differential are disposed in the axle housing component, and the two half axles are connected to the two output ends of the differential respectively, and the electric powertrain is installed on the axle housing component; and
    a central parking module installed on the axle housing component and configured to brake the input end of the differential directly, wherein the central parking module and the electric powertrain are installed on opposite sides of the axle housing component.

2. The electric drive axle assembly according to claim 1, wherein the central parking module comprises:
    a parking box, installed on the axle housing component; and
    a parking brake, fixed to the parking box and configured to brake the input end of the differential directly.

3. The electric drive axle assembly according to claim 2, wherein the input end of the differential comprises a differential input gear; and
    the central parking module further comprises: a parking shaft, connected to the parking brake; and a parking gear, fixed to the parking shaft and engaged with the differential input gear.

4. The electric drive axle assembly according to claim 3, wherein the parking shaft is supported on the parking box through a parking bearing.

5. The electric drive axle assembly according to claim 3, wherein the parking shaft and the parking gear are integrated as a parking gear shaft.

6. The electric drive axle assembly according to claim 3, wherein the parking brake comprises:
    a brake drum, connected to the parking shaft; and
    a brake structure, selectively joined with the brake drum to brake the brake drum.

7. The electric drive axle assembly according to claim 6, wherein the central parking module further comprises a connecting box, and the parking brake and the parking box are connected through the connecting box.

8. The electric drive axle assembly according to claim 7, wherein the central parking module further comprises a flange fixed to the parking shaft and disposed within the connecting box, and the brake drum is connected to the parking shaft through the flange.

9. The electric drive axle assembly according to claim 3, wherein the transmission comprises:
    an input shaft fixed with an input gear, and connected to a motor output shaft of the power motor;
    an intermediate shaft fixed with an intermediate gear and a plurality of gear driving gears, wherein the intermediate gear is engaged with the input gear; and
    an output shaft fixed with an output gear engaged with the differential input gear, wherein a plurality of gear driven gears are freely fitted over the output shaft and engaged with the plurality of gear driving gears respectively.

10. The electric drive axle assembly according to claim 9, wherein the plurality of gear driving gears comprise: a first-gear driving gear and a second-gear driving gear; and the plurality of gear driven gears comprises: a first driven gear engaged with the first-gear driving gear, and a second driven gear engaged with the second-gear driving gear.

11. The electric drive axle assembly according to claim 10, wherein the transmission further comprises:
    a synchronizer that selectively joins one of the first driven gear and the second driven gear with the output shaft.

12. The electric drive axle assembly according to claim 2, wherein the transmission has a transmission housing with the power motor fixed thereon, the transmission housing is fixed to one of a front side or a back side of the axle housing component, the central parking module is disposed to the opposite side of the axle housing component, and the differential is supported on the transmission housing and the parking box.

13. The electric drive axle assembly according to claim 12, wherein the axle housing component comprises an axle housing and an axle cover, the transmission housing is fixed to the one side of the axle housing, the axle cover is detachably disposed to the other side of the axle housing, the axle cover is configured as a cylindrical structure having two open ends, and the parking box passes through the axle cover and is supported on the axle cover.

14. A vehicle, comprising the electric drive axle assembly according to claim 1.

* * * * *